US012378980B2

(12) United States Patent
Rodighiero et al.

(10) Patent No.: US 12,378,980 B2
(45) Date of Patent: Aug. 5, 2025

(54) ROTARY ACTUATOR UNIT WITH LOAD CONTROL

(71) Applicant: MOVECO S.r.l., Grignasco (IT)

(72) Inventors: Umberto Rodighiero, Grignasco (IT); Guido Rotti Gianet, Grignasco (IT); Marco Rotti

(73) Assignee: MOVECO S.r.l., Grignasco (IT)

(*) Notice: Subject to any disclaimer, the term of this patent is extended or adjusted under 35 U.S.C. 154(b) by 0 days.

(21) Appl. No.: 18/748,361

(22) Filed: Jun. 20, 2024

(65) Prior Publication Data

US 2024/0426324 A1 Dec. 26, 2024

(30) Foreign Application Priority Data

Jun. 20, 2023 (IT) ........................ 102023000012627

(51) Int. Cl.

| | |
|---|---|
| ***B66F 11/04*** | (2006.01) |
| ***F15B 15/02*** | (2006.01) |
| ***F15B 15/14*** | (2006.01) |
| ***F15B 15/28*** | (2006.01) |

(52) U.S. Cl.

CPC ............ *F15B 15/14* (2013.01); *B66F 11/046* (2013.01); *F15B 15/02* (2013.01); *F15B 15/2815* (2013.01)

(58) Field of Classification Search

CPC ....... E02F 3/3681; B66F 9/149; B66F 11/046; B66F 11/044; B66F 17/006

See application file for complete search history.

(56) References Cited

U.S. PATENT DOCUMENTS

| | | | | |
|---|---|---|---|---|
| 4,313,367 | A * | 2/1982 | Weyer | F16C 17/10 92/33 |
| 5,746,286 | A * | 5/1998 | Mlaker | B66F 11/044 182/2.1 |
| 6,585,079 | B1 * | 7/2003 | Weyer | B66F 9/0655 182/2.7 |
| 10,843,912 | B1 * | 11/2020 | Daniel | B66F 17/006 |
| 2012/0263616 | A1 * | 10/2012 | Rosenboom | F04B 9/02 418/81 |

(Continued)

FOREIGN PATENT DOCUMENTS

WO 0144101 A2 6/2001

OTHER PUBLICATIONS

Search Report, Ministry of Enterprises and Made in Italy, Jan. 2, 2024.

*Primary Examiner* — Thomas E Lazo
(74) *Attorney, Agent, or Firm* — Bay State IP, LLC

(57) ABSTRACT

Disclosed is a rotary actuator unit with a casing and an internal rotating shaft integral with rotating end flanges projecting from said casing at a main axis of rotation, a load cell apt to detect a load acting on one of said rotating end flanges, further comprising an articulated link parallelogram frame defined by a pair of end brackets constrained to said rotating end flanges, equipped with respective hinge bodies defining parallel hinge axes in which first hinge pins are pivotingly engaged, a pair of lower and upper end plates hinged at proximal end to said hinge pins, said lower and upper end plates being provided with second hinge pins at a distal end, and an attachment plate hinged at respective ends to said second hinge pins, and in which said upper end plates is abutting said load cell and attachment plate has fastening means to engage a user structure.

8 Claims, 6 Drawing Sheets

(56) References Cited

U.S. PATENT DOCUMENTS

| | | | | |
|---|---|---|---|---|
| 2019/0127194 | A1* | 5/2019 | Hansen | E02F 3/96 |
| 2021/0114850 | A1* | 4/2021 | Radenslaben | B66F 11/046 |
| 2022/0112062 | A1* | 4/2022 | Watanabe | B66F 17/006 |

* cited by examiner

ROTARY ACTUATOR UNIT WITH LOAD CONTROL

CROSS REFERENCE TO RELATED APPLICATION

This application claims the benefit of and takes priority from Italian Patent Application No. 102023000012627 filed on Jun. 20, 2023, the contents of which are herein incorporated by reference.

FIELD OF THE INVENTION

The present invention relates to the field of rotary actuators. In particular, the present invention relates to an improved rotary actuator with continuous load control.

BACKGROUND OF PRIOR ART

Rotating actuators are used in a variety of fields. In the following, specific reference will be made to the field of aerial platforms, but the invention is not limited to this sector.

Aerial work platforms are machines that allow one or more operators to lift and hold one or more workers in position (at height), enabling them to perform a task in places that are normally not accessible without the installation of scaffolding, for example. Aerial platforms are particularly preferred in cases where it is necessary to provide occasional access to elevated positions, e.g. in the maintenance of street lighting, accessing elevated floors of buildings, pruning trees, working on power lines, and so on.

There are several types of aerial platforms on the market, but in general they consist of a vehicular portion from which extends a lifting boom at the end of which there is provided a basket or working platform. The vehicular portion is equipped with two or more wheels (or tracks) and optionally with securing means, which allow the aerial platform to remain firmly attached to the ground during its operation. An extendable lifting boom extends from the vehicular portion, carrying at its distal end the basket or platform that safely houses the operators. As it extends, the boom raises the platform to the predetermined height and distance based on a control available on the platform itself or on the vehicle portion.

In addition to the lifting and/or extension movement performed by the boom, the platforms or baskets must be able to rotate around their vertical axis in order to correctly orient the operators towards the area of intervention.

The rotation of the basket around its axis is achieved with an actuator, usually a hydraulic actuator because the movement of the extending boom is also normally achieved by means of a pressurised hydraulic circuit.

A hydraulic rotary actuator is known and has a fixed containment body, on which suitable helical grooves are integrally machined (or keyed) and, within which, a rotating shaft is arranged which also has suitable helical grooves. These grooves engage in corresponding grooves of a longitudinally moving piston, in the two opposite directions, under the action of the hydraulic fluid. The rototranslating movement of the piston is converted into a rotation of the rotating shaft, to which the base of the platform is coupled, e.g. with a flange.

Rotary actuators are described for example in WO8700590, U.S. Pat. No. 4,313,367 or US2012263616.

However, rotary actuators are not exclusively hydraulic, but can also be of a different nature, e.g. electric (i.e. with a transmission driven by an electric motor).

Platform manufacturers normally buy conventional rotary actuators existing on the market and adapt and integrate them into their own construction.

In addition to this integration requirement, which requires some design effort, platform manufacturers need to integrate other units in the vicinity of the aerial platform, in particular a weight sensing unit.

In fact, since the extension boom does not only lift the platform vertically, but typically also with a horizontal component—which allows the operators to move closer to the operating position than where the vehicle portion is located—it is important to ensure the static stability of the platform to prevent it from tipping over or collapsing. In order to achieve this safely, it is necessary to determine the weight bearing on the platform, so that—by means of a calculation of the moments transmitted by the lifting boom—it can be ensured that the overall centre of gravity of the machine, with its occupants, does not fall off the ground support perimeter. This is achieved by installing a load cell on the basket of the aerial platform to detect the weight and its point of application. This therefore requires the platform manufacturer to have, between the extending boom and the rotating actuator (or between the latter and the platform basket), a sensor or weight detection unit, which provides a suitable signal to the control unit that—with appropriate calculation of forces and moments—always maintains the operation of the platform in its safety envelope, at the very least excluding the wrong command set by the operators.

A natural solution to these integration and control problems is to mount a load-sensing sensor on the mounting bracket of the rotary actuator or immediately below the actuator. Examples of known technique are described in U.S. Ser. No. 10/843,912 and WO01/44101.

These solutions, however, are not always congenial to the platform manufacturer, who is forced to develop customised construction solutions, on which he must perform a series of checks and certifications. In addition, a direct and rigid mounting of the load cell on the brackets or rotating actuator risks introducing bending moments on the load cell that provide an incorrect reading signal.

This drawback is further amplified by the fact that the weight on the platform is often applied in different positions, as operators move around in the basket during their work.

There is therefore a need for a rotary actuator integrated with a weight-sensing sensor that is reliable and easily integrated into aerial platforms.

SUMMARY OF THE INVENTION

The purpose of the present invention is to solve the design drawbacks outlined above by providing an integrated rotary actuator unit with a load sensor, to be mounted, for example, on an aerial platform, which provides detection of the weight bearing on the unit without introducing errors due to the transfer of bending moments to the load sensor.

A further purpose of the invention is to integrate into the same unit a detection of the actuator's angle of rotation too, which would indirectly allow for greater control of the tilting moments acting on an aerial platform (or other equipment attached to the actuator), allowing the relative position of the load with respect to the axis of rotation to be known at any instant.

Finally, a further aim is to define in the integrated actuator unit also a suitable control to correct the attitude of the platform basket according to the horizontal extension of the extending boom.

These purposes are achieved through the features described in their essential aspects in independent claim 1 and the additional features provided for in the dependent claims.

BRIEF DESCRIPTION OF THE DESIGNS

Further features and advantages of the invention will, however, be best illustrated by the following detailed description of preferred embodiments, given purely by way of example and not limitation, and illustrated in the accompanying drawings.

DETAILED DESCRIPTION OF PREFERRED EMBODIMENTS

Figure 1:
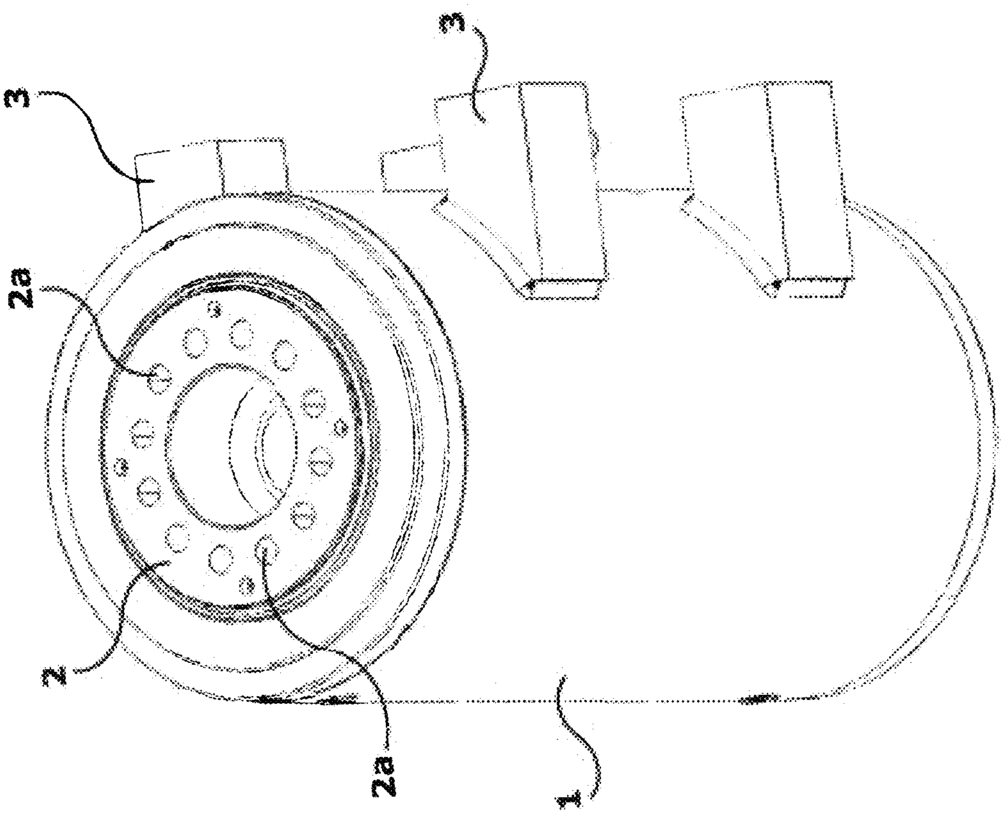
Fig. 1 Prior art
FIG. 1 is a perspective view of a typical hydraulic rotary actuator of known technology.

Referring to FIG. 1, consider that a typical hydraulic rotary actuator consists of a hollow cylindrical casing 1, which houses a rotating shaft (not illustrated) that has two end flanges 2 provided with appropriate fixing holes 2a to connect the operating elements to be rotated. On the outer casing 1 are typically arranged attachment means 3, through which the actuator is fixed to a fixed reference structure.

As mentioned above, for the sake of ease of exposition, in the following reference will always be made to a hydraulic actuator, but it is understood that this mode of control is not exclusive or limiting, as it is understood that the rotary actuator can also be electric or other.

The rotating shaft, together with the respective end flanges 2, is set into rotation by means of a hydraulic mechanism, known in itself, which transforms the rototranslating movement of an internal piston (not visible) into the rotation of the shaft and flanges 2.

In the installation, attachment means 3 are joined to a fixed frame and on flanges 2 the user device is directly mounted, which must be rotated relative to the fixed frame. Typically, in an aerial platform application, the attachment means 3 are attached to the frame of the extending boom, while the platform basket is directly attached to an upper flange 2 of the actuator.

However, since the present invention is not limited to a particular hydraulic actuator but can potentially be applied to various rotary hydraulic actuators, further details concerning the known operation of the actuators will be omitted.

According to the invention, a rotary actuator has a cylindrical casing 200 housing a rotating shaft (not shown) projecting at both ends with respective end flanges (not shown) to which two lower end bracket 201 and upper end bracket 202 are attached.

On the cylindrical casing 200, there may be provided a reference plate 200' to which, in manner known per se, a distribution valve 203 may be installed to which the hydraulic fluid supply pipes may be connected. Also integral with the casing 200 there are provided retaining means 200a and 200b through which the actuator can be fixed to a reference frame (not illustrated), for example by means of fixing bolts $B_1$.

The end brackets 201 and 202 have a base portion 201a and 201b—attached to the respective end flange of the rotating shaft by means of removable fasteners, e.g. a plurality of Allen screws $B_2$ arranged circumferentially—from which a hinge body 201b and 202b extends, defining lower $X_1$ and upper $X_2$ pivot or hinge axis, respectively.

In particular, the two hinge bodies 201b and 202b have a cylindrical cavity in which respective bearings or bushings 201' and 202' of appropriate material are fit, which pivotingly accommodate respective hinge pins $P_1$ and $P_2$.

End brackets 201 and 202 are mounted on the respective end flanges of the rotating shaft so that the two pivot axes $X_1$ and $X_2$ are parallel to each other.

Figure 2B:
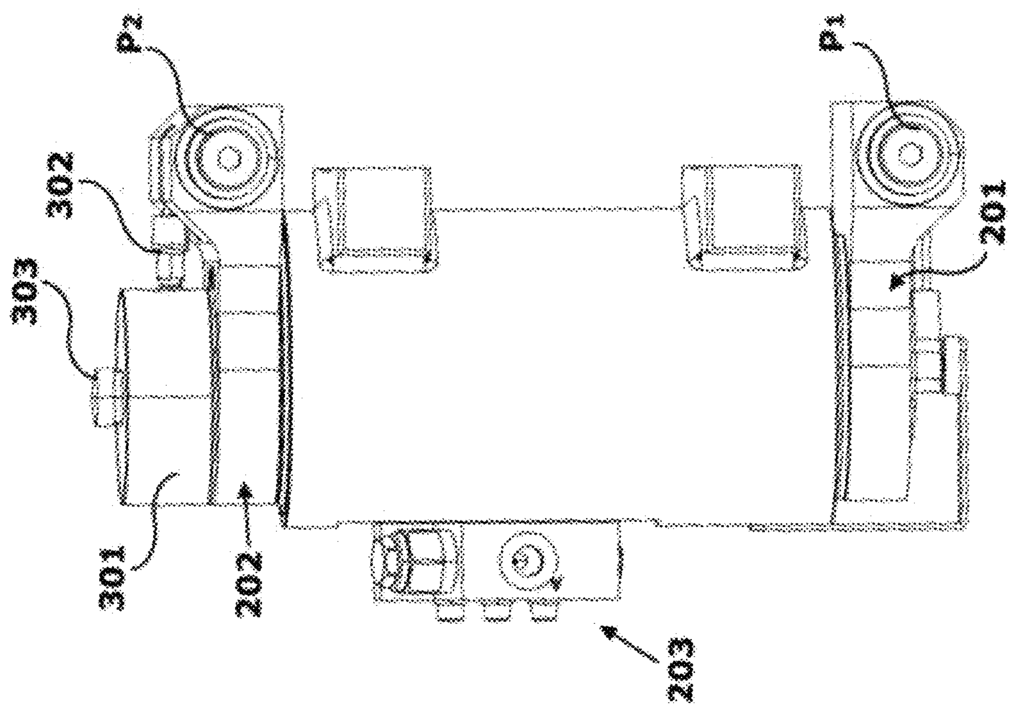
FIG. 2B is a side elevation view of the actuator of FIG. 2A.
Figure 2A:
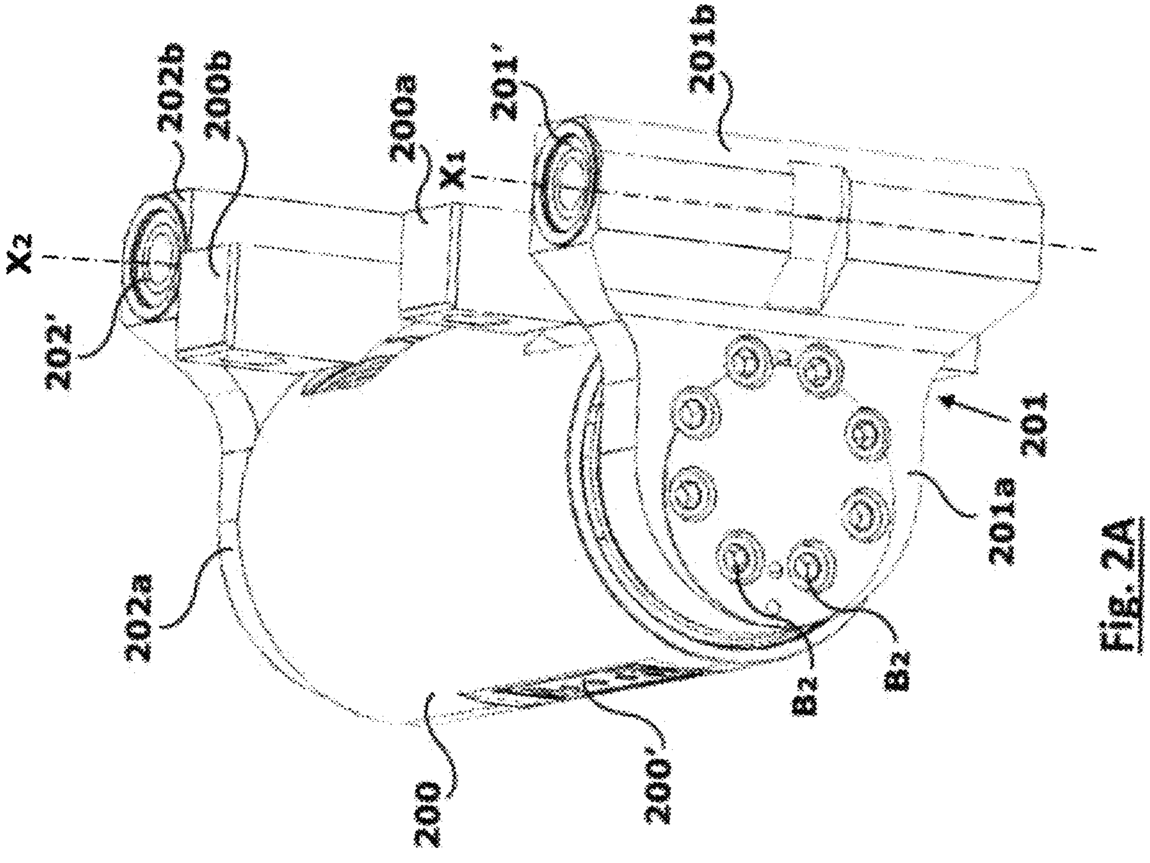
FIG. 2A is a perspective view of a hydraulic rotary actuator according to the present invention provided with rotating constraint brackets and with the other parts removed.
Figure 4:
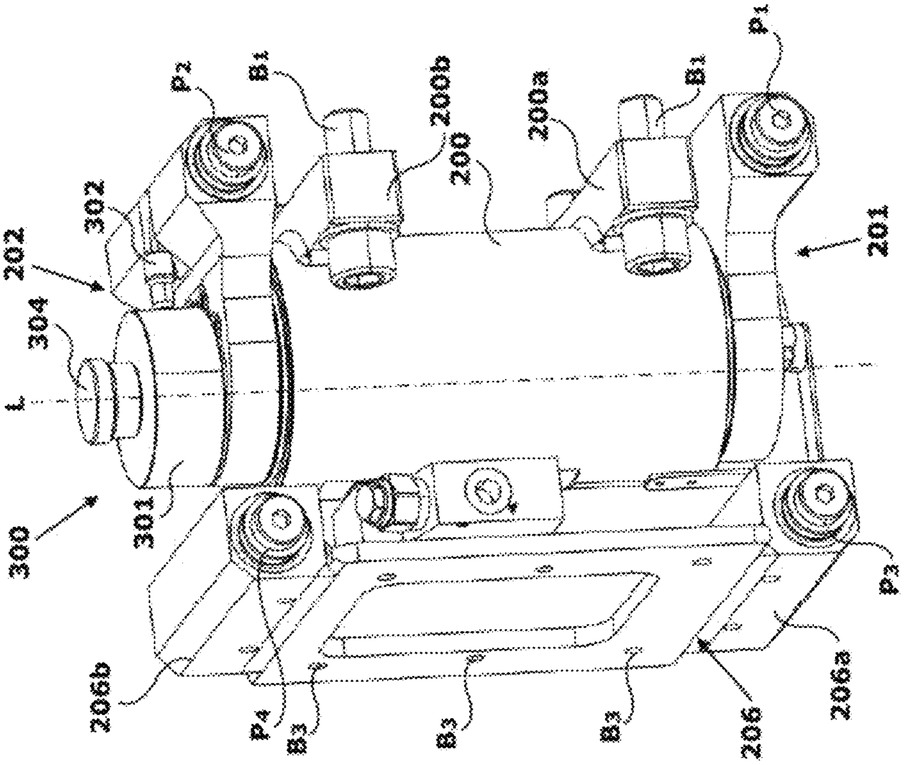
FIG. 4 is a perspective view of the actuator in FIG. 2A with attachment plate mounted.

In FIGS. 2B and 4 it is clearly visible that a load sensor 300, e.g. a typical load cell, is installed on the upper end bracket 202.

A load cell 300 comprising a base body 301, a wiring harness 302 and an upper load button 303 is illustrated in the figures, but the specific configuration is not particularly relevant; instead, it is essential that the load cell is arranged and calibrated to detect the applied stresses according to a specific detecting direction, for example a detection direction L parallel to the longitudinal axis of rotation of the rotating actuator. At the same time, it is preferable for the two hinge axes $X_1$ and $X_2$ to be arranged at the same distance from this detecting direction L, which is typically parallel to the axis of rotation of the actuator: in other words, the common locating plane of the hinge axes $X_1$ and $X_2$ is parallel to the detecting direction L.

According to a peculiar feature of the invention, respective lower end plates 204 and upper end plates 205 are hinged to the lower hinge pin P1 and upper hinge pin P2, which plates in turn are coupled to each other by an attachment plate 206 via a further pair of movable hinge pins $P_3$ and $P_4$. This results in an articulated quadrilateral links configuration, with two fixed hinges on pivots $P_1$ and $P_2$ and two movable hinges on pivots $P_3$ and $P_4$, with three movable sides consisting of end plates 204 and 205 and attachment plate 206.

The attachment plate 206 has fastening means, e.g. threaded holes $B_3$, for attaching a user structure, in particular the basket structure in an aerial platform.

The two end plates 204 and 205 have equal lengths or, rather, are configured such that the distance between the homologous hinge pins $P_1$-$P_3$ and $P_2$-$P_4$ are equal. At the same time, the length of the attachment plate 206 is such that the distance between the pivots $P_3$ and $P_4$ is the same as the distance between the pivots $P_1$ and $P_2$, thus defining an articulated link parallelogram.

In this way, the laying plane of the two hinge pins $P_3$ and $P_4$ remains parallel to the laying plane of the two hinge axes $X_1$ and $X_2$: therefore, the attachment plate 206 is constrained to perform micro-movements around the two hinge pins $P_1$ and $P_2$ which are pure translations without rotation (as is typical of a connecting rod element in an articulated link parallelogram), in particular a displacement parallel to the detection axis L of the load cell 300.

The two movable hinge pins $P_3$ and $P_4$ are mounted in respective bushings inserted in hinge bodies **206*a* and 206*b* of the attachment plate 206**, in a similar way to the mounting system of the fixed pivots $P_1$ and $P_2$.

Figure 3:
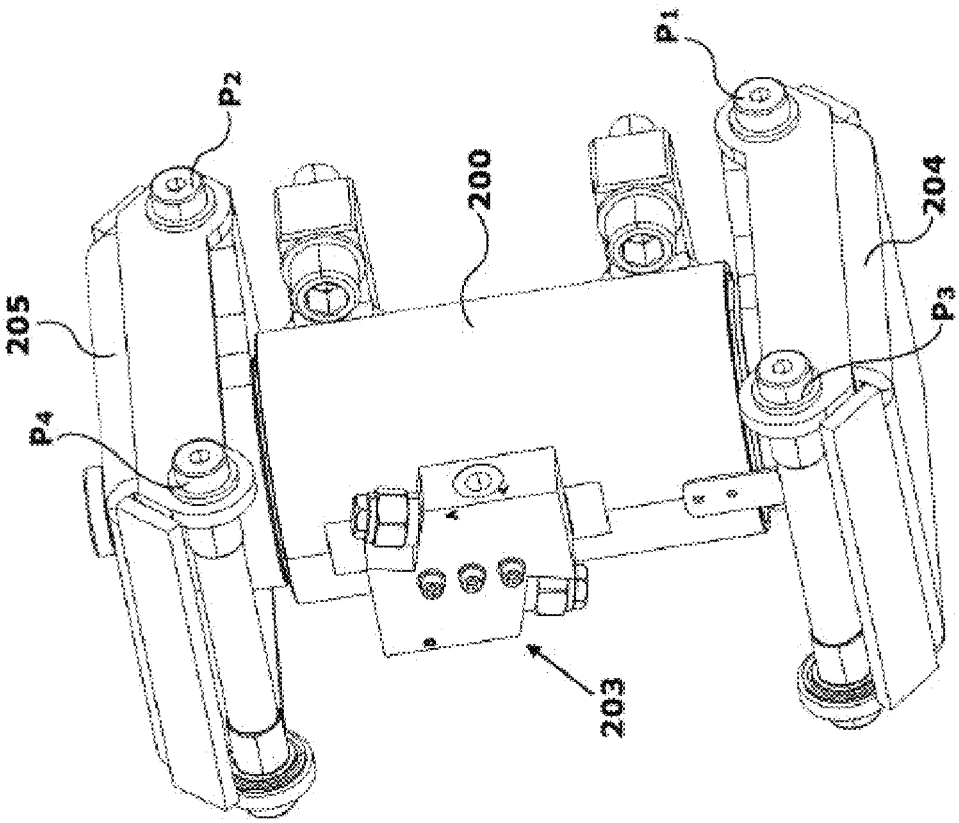
FIG. 3 is a perspective view of the actuator of FIG. 2A with end plates mounted.
Figure 5B:
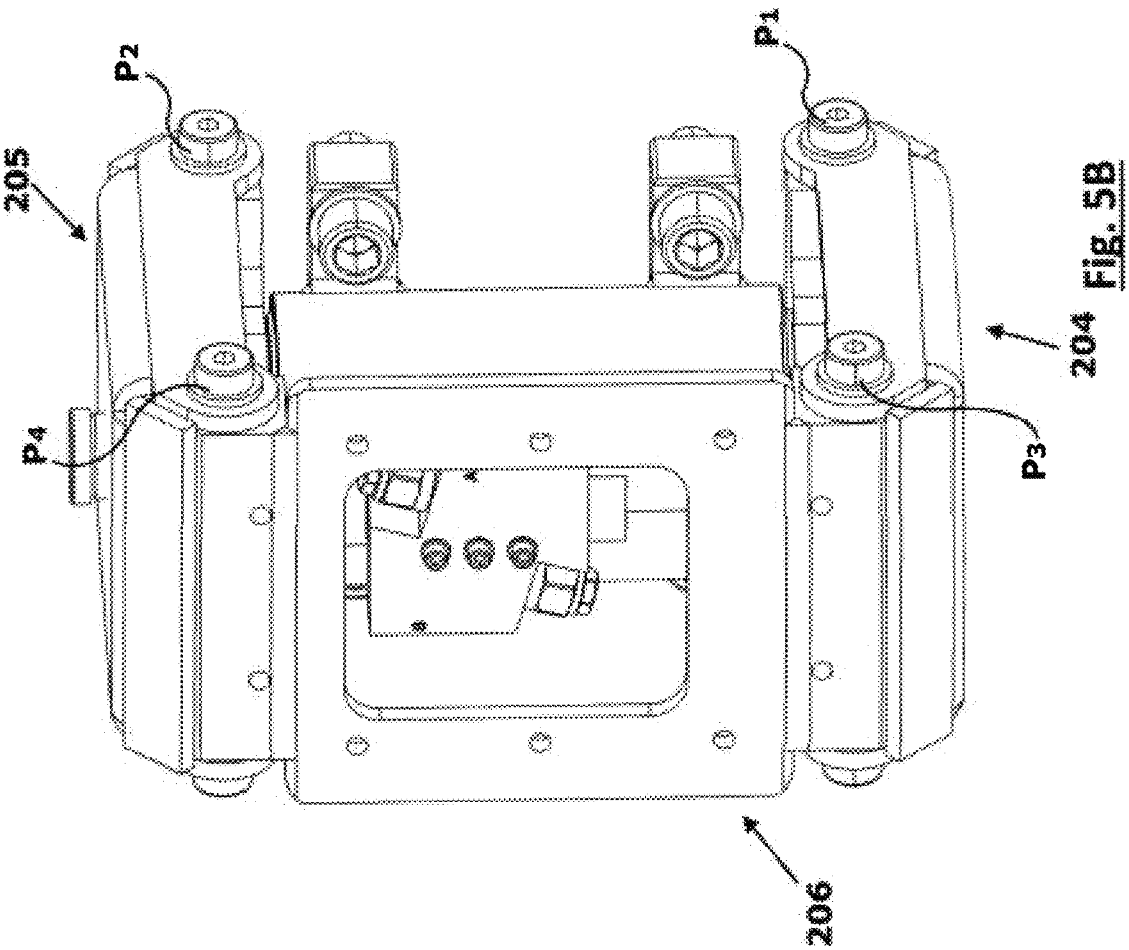
FIG. 5B is a similar view to FIG. 5A according to a different perspective.
Figure 5A:
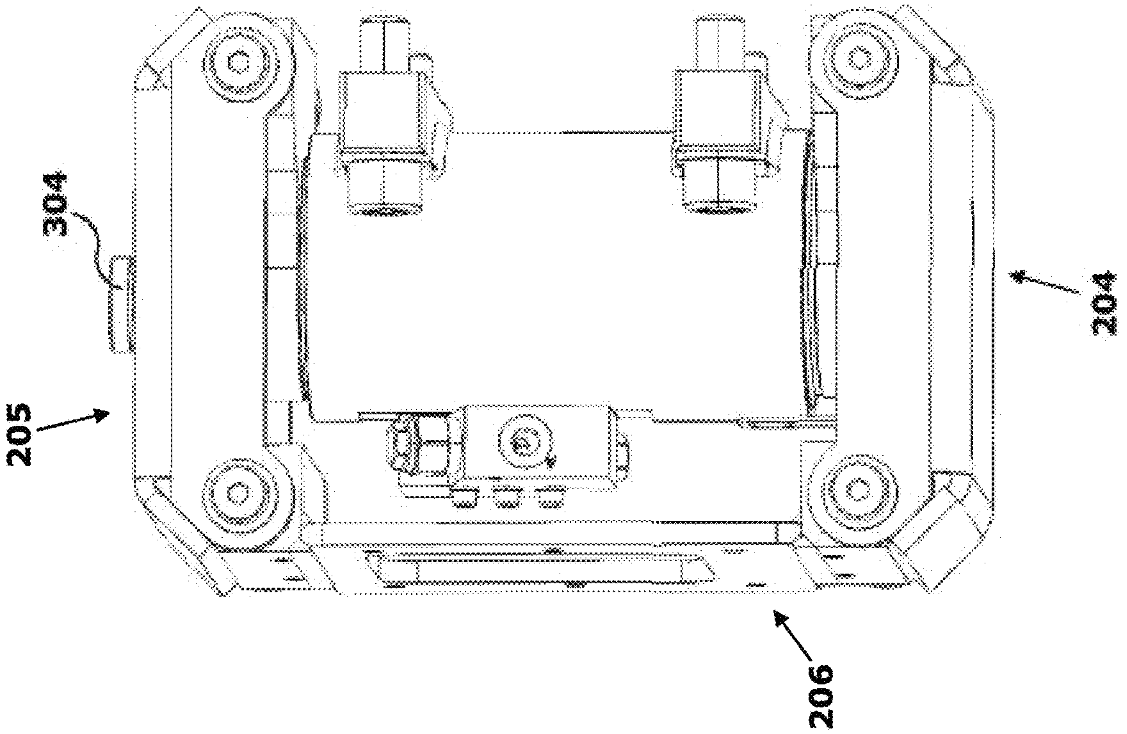
FIG. 5A is a perspective view of the actuator of FIG. 2A with attachment plate and end plates mounted.

The two end plates 204 and 205 preferably are not simple straight beams between the two points of articulation, but have a concave shell shape and are then mirror mounted to each other, as clearly visible in FIGS. 3, 5A, 5B. The two end plates 204 and 205 may be manufactured from a solid piece machined to give a concave shape or, preferably, are made from a metal sheet of a thickness suitable to support the design loads, for example 6-15 mm thick, cut and folded.

This arrangement makes it possible to define a housing space between the concave shell of the plates and the opposing plane of the respective brackets 201 and 202, which on the bottom part allows the load cell 300 to be installed, and on the upper part allows the installation of a positioning sensor 400, which will be described below.

Figure 5C:
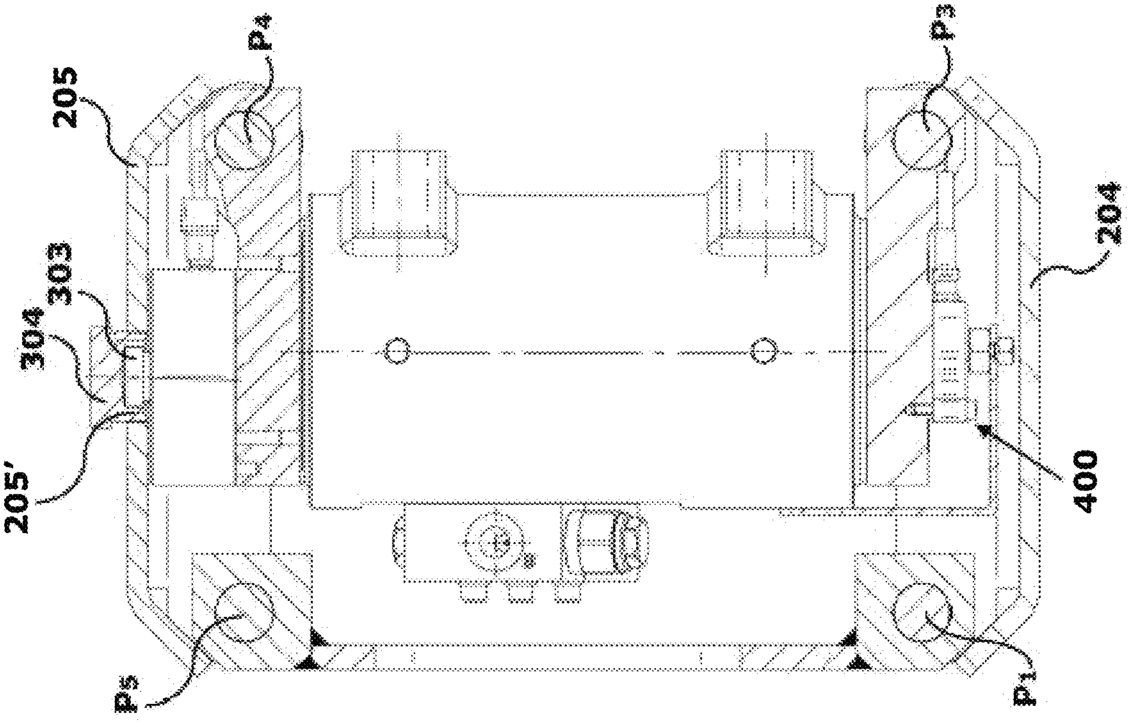
FIG. 5C is a longitudinal sectional view of the actuator in FIG. 5A.

The shell of the upper end plate 205 rests on the load cell 300, more precisely on the upper portion 301 of the load cell.

Where provided, the loading button 303 passes through a circular opening 205' in the shell of the upper end plate 205. In this embodiment, as illustrated in FIG. 5C, preferably an adjustable load cap 304 is fit into the opening 205' of the upper end plate 205, for example a load cap 304 provided with an external thread that engages with a nut thread of the opening 205'. In this way, an inner end portion of cap 304 determines a stop position on the loading button cell 303, but it is possible to adjust—by unscrewing or screwing the end cap 304 into the opening 205'—the relative position between the upper plate 205 and the load cell 300.

With this configuration, advantageously, the load acting on the utilisation structure—typically the basket of the aerial platform—does not weigh on the load cell with an interlocking constraint (as was the case with the prior art), but acts on the load cell 300 by means of a labile structure (constituted by the articulated plates 204-206) which transfers to the load cell only a force having a direction according to the detection axis L and is not capable of introducing localised bending moments. The load cell 300, by detecting the load acting on it and outputting an analogue or proportional digital signal, allows closed-loop control of the total weight acting on the aerial platform basket, which ensures that the minimum safety requirements for placing machines on the market are met. The special labile constraint with which the load is applied to the load cell makes the signal reliable and not subject to abnormal perturbations due to the displacement of the load application area in the basket (which, in prior art solutions, introduces bending moments into the load cell itself).

During the rotation of the actuator, the casing 200 remains in a fixed position in relation to the reference frame to which it is attached by means of the retaining means **200*a* and 200*b*, while the rotating part with the rotating shaft is formed by the end brackets 201 and 202 with the entire transmission formed by the articulated parallelogram link 204-206**.

According to a preferred embodiment of the invention, a positioning sensor 400 is installed between the lower end bracket 201 and the lower end plate 204. The positioning sensor 400 is provided for detecting the angle of rotation of the rotating part with respect to the fixed part of the actuator. Preferably, the positioning sensor 400 may be a non-contact sensor, such as a Hall effect sensor.

Figure 6:
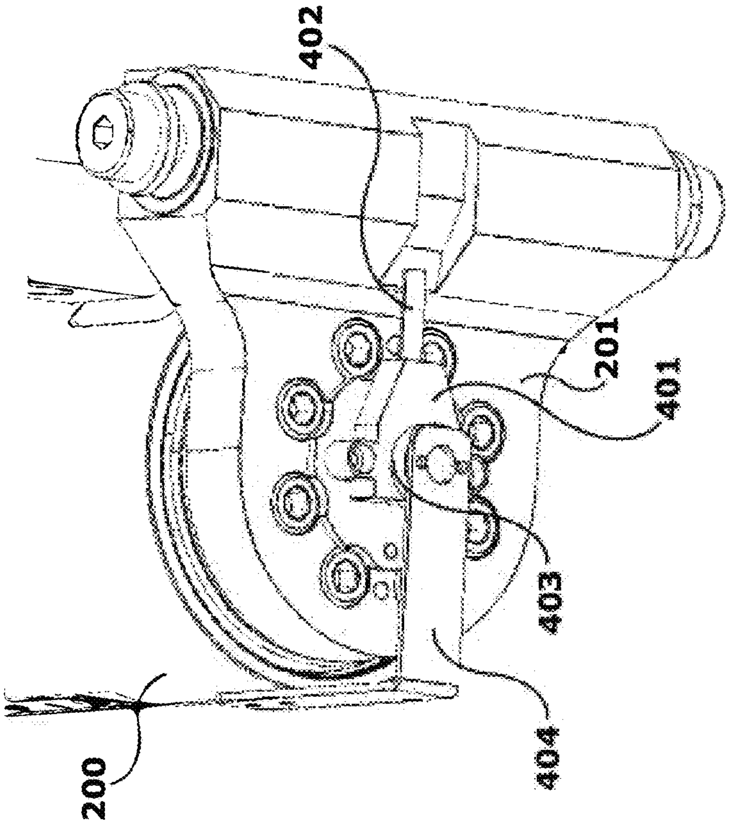
FIG. 6 is an interrupted perspective view of an actuator detail according to the invention.

The positioning sensor 400 can be accurately described by referring to FIG. 6. The sensor 400 has a sensor housing 401, with an associated wiring harness 402, attached to the lower bracket 201 which is rotatably integral with the rotational shaft of the actuator. As the sensor 400 is preferably a Hall effect angular sensor, the system further comprises a fixed magnet 403, connected to the casing 200 by means of a support bracket 404, arranged in close proximity to the sensor body 401.

During the rotation of the lower bracket 201 with respect to the casing 200, a relative rotation occurs between the sensor body 401 and the magnet 403, which results in an angular position detection: the positioning sensor 400 thus outputs a signal indicative of angular positioning which, via the wiring 402, is transmitted to a control logic (not shown) provided on board the user system, for example an aerial platform control console. Applied to an aerial platform system, this sensor allows continuous control of the angular position of the actuator and thus of the basket in which the operators are accommodated.

The angular sensor adds a relevant function to the system, providing a continuous indication of the basket's angular position and opening up the possibility of feedback control of the hydraulic control system, which results in a decidedly 'smoother' movement of the basket, especially when the actuator's rotational travel approaches the mechanical end stop; this type of feedback control also allows the actuator's travel to be limited by the control electronics.

Figure 7:
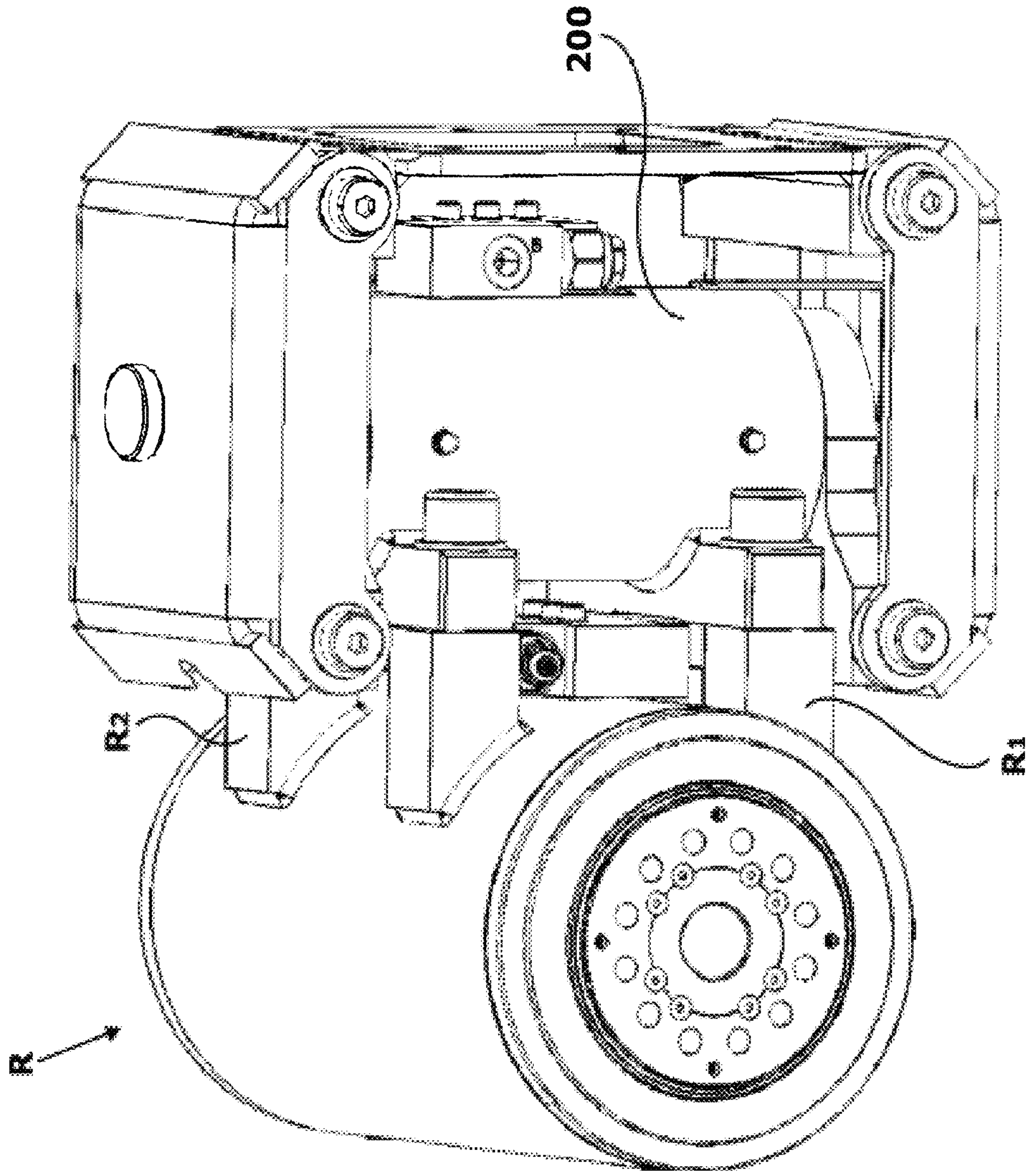
FIG. 7 is a perspective view of the rotary actuator according to another embodiment of the invention.

FIG. 7 illustrates a further embodiment of the actuator according to the invention, wherein retaining means **200*a* and 200*b*** are attached to a casing of a second rotary actuator R by respective retaining means $R_1$ and $R_2$. The relative arrangement between the two actuators is such that the respective rotation axes are perpendicular to each other.

The rotating end flanges of this second actuator R are in turn constrained to a structure of the user component, e.g. the frame of the aerial platform basket.

In this way, an integrated module is obtained with two actuators rotating along two orthogonal rotation axes. This module, suitably controlled in feedback, makes it possible to perfectly orientate the attitude of an aerial platform basket, or other user component, as the angle taken by the support boom with respect to the horizontal plane changes.

As is clear from the description provided, the rotary actuator unit according to the invention perfectly fulfils the purposes set out in the introduction.

Compared to conventional solutions of prior art, in fact, this unit makes it possible to accurately and reliably detect the actual load on the basket and its angular position simultaneously and continuously, actively contributing to operator safety;

ensure greater rigidity of the load-bearing structure and repeatability of load data;

obtain good protection of the sensors associated with the unit;

reduce the weight and bulk of the entire system;

minimise the amount of routine maintenance required;

offer a 'plug and play' product to aerial platform builders, whereas with conventional systems the rotary actuator and sensors shall be purchased as separate components and subsequently integrated on the machine.

It is understood, however, that the invention is not to be considered limited to the particular provisions illustrated, which are only exemplary embodiments of the invention, but that several variants are possible, all within the reach of a person skilled in the art, without going beyond the scope of protection of the invention itself, as defined by the following claims.

For example, the mechanism by which the upper end plate transfers the load to the load cell may also be different from that illustrated, provided that there is a direct or indirect abutment support without interlocking between the upper plate and the load cell.

What is claimed is:

1. A rotary actuator unit comprising
a casing (200) and an internal rotating shaft integral with rotating end flanges projecting from the casing (200) at a main axis of rotation,
retaining means (B1, 200*a*, 200*b*) integral to a housing (200),
a load cell (300) apt to detect a load acting on one of the rotating end flanges, characterised by which it further comprises
an articulated link parallelogram frame defined by
a pair of end brackets (201, 202) constrained to the rotating end flanges, equipped with respective hinge bodies (201*b*, 202*b*) defining parallel hinge axes (X1, X2) in which first hinge pins (P1, P2) are pivotingly engaged,
a pair of lower (204) and upper (205) end plates hinged a proximal end to the hinge pins (P1, P2),
the lower (204) and upper (205) end plates being provided with second hinge pins (P3, P4) at a distal end,
and also an attachment plate (206) hinged at respective ends to the second hinge pins (P3, P4),
and by that the upper end plate (205) is abutting the load cell (300) and the attachment plate (206) has fastening means ($B_3$) to engage a user structure.

2. The rotary actuator unit as in claim 1, wherein the lower end plates (204) and upper end plates (205) have a concave shape and are hinged on the hinge pins (P1, P2) mirroring each other.

3. The rotary actuator unit as in claim 2, wherein the load cell (300) is interposed between the upper end plate (205) and the corresponding end bracket (202).

4. The rotary actuator unit as in claim 2, wherein the load cell (300) is provided with a load button (303) passing through in an opening (205') of the upper end plate (205) and is abutting a cap (304) engaged adjustable in the opening (205').

5. The rotary actuator unit as in claim 2, wherein a relative positioning sensor (400) is provided between the lower end plate (204) and the corresponding end bracket (201).

6. The rotary actuator unit as in claim 5, wherein the relative positioning sensor (400) is a hall effect sensor having a sensor body (401) rotatably integral with a respective end bracket (201) and a magnet (403) integral with the casing (200).

7. The rotary actuator unit as in claim 1, wherein the retaining means (B1, 200*a*, 200*b*) are joined to corresponding retaining means (R1, R2) of a second rotary actuator (R) having a rotation axis perpendicular to a main rotation axis.

8. The rotary actuator unit as in claim 1, wherein the rotating shaft is rotated by means of a hydraulic fluid drive contained within the casing (200).

* * * * *